July 28, 1959     J. P. LARSEN     2,896,574
MILKING CLAW FOR A MILKING MACHINE
Filed May 13, 1957
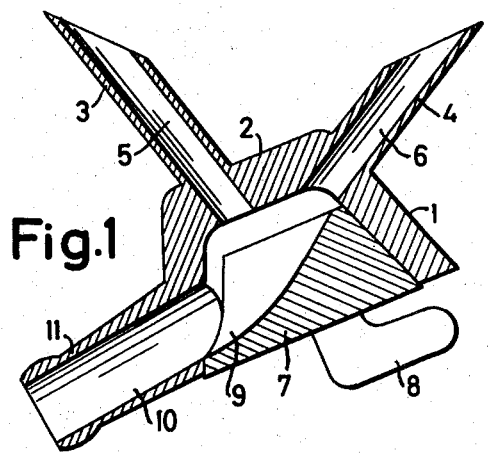
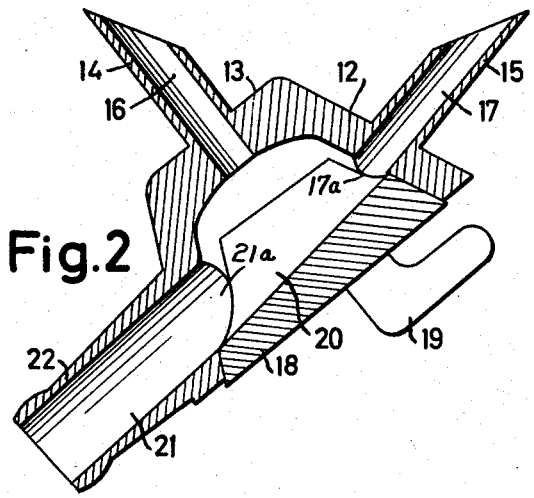
Inventor
Johannes Peter Larsen
by Stevens, Davis, Miller, Mosher
his attorneys

United States Patent Office 2,896,574
Patented July 28, 1959

2,896,574

MILKING CLAW FOR A MILKING MACHINE

Johannes Peter Larsen, Copenhagen, Denmark

Application May 13, 1957, Serial No. 658,778

Claims priority, application Denmark May 15, 1956

8 Claims. (Cl. 119—14.54)

The present invention relates to a milking claw, also called a milking central or teat cup claw, for a milking machine, the milking claw being of the type having a cock casing and a cock plug, four channels designed in the cock casing for connection with teat cups, besides a discharge channel for connection with a milk conduit.

In the milking machine milking claws of the said type hitherto known, the discharge channel extends substantially horizontally outwards. This, however, entails the drawback that the milk cannot flow sufficiently easily from the milking claw, and the pumping action caused by the pulsations in the teat cups may then cause the milk to be pumped up and down between milking claw and teat cups, the milk so to speak washing the teats, so that impurities on the latter may be washed off and be carried along with the milk.

Certainly, it has been proposed to place the discharge channel obliquely, but as its inner mouth is located in an oblique sealing face for the vertically placed cock plug, which normally tapers a little with a downwardly increasing diameter, the discharge channel cannot be placed very much obliquely without its mouth getting a comparatively great height, caused by the comparatively small, acute angle which the discharge channel will then form with the tapering sealing face. This will entail that the cock plug and thereby also the cavity of the cock casing must have a rather great height, which makes cleaning difficult. It has therefore in the known milking machine milking claws with vertical axis for the cock plug only been possible to have a very slight obliquity of the discharge channel, and this has not entailed any essential improvement as regards the discharge of the milk.

The purpose of the present invention is to provide a milking machine milking claw of the type referred to above in which the drawbacks of the known embodiments have been remedied, so that good discharge conditions are obtained, while at the same time the possibility of an easy and effective cleaning is preserved.

The characteristic feature of the invention consists in that the axis of rotation of the cock plug is at a considerable angle to the vertical direction of the milking claw, the said vertical direction being determined by the connection members of the supply channels, and that, the discharge channel extends downwards in a direction which is at a considerable angle to the horizontal plane. By a considerable angle should be understood an angle of over 5°, preferably, however, considerably more, e.g. 30–45° or still more.

When the milking machine milking claw is designed according to the invention, the possibility is obtained of placing the discharge channel with a suitable declination without its inner mouth getting too great a height. With a view to this, the discharge channel may preferably extend substantially at right angles to the axis of the cock plug.

According to a further development of the invention, the axis of the discharge channel is located substantially in the vertical plane containing the axis of rotation of the cock plug, as hereby the discharge channel will extend as much downwards as possible at the said angular position of the axis of the cock plug in relation to the vertical plane, and at the same time an advantageous position of the milk hose connected thereto is obtained.

Further developments of the invention will appear from the following description and from the attached claims.

The invention is illustrated in the drawing by two different embodiments of a milking machine milking claw according to the invention, Figs. 1 and 2 illustrating vertical sections through a milking claw according to the two embodiments.

Numeral 1 in Fig. 1 designates a conical side wall of a flaring cock casing, and 2 the end wall of the latter. The cock casing is provided with four divergent supply branches or tubes, only two of which can be seen, designated by 3 and 4. The two other supply branches lie behind those shown. In the branches, supply channels 5 and 6 are provided which terminate inside the end wall 2 and in the corner between the end wall 2 and the side wall 1, respectively. In the cock casing 1, 2, a cock plug 7 with a handle 8 and a milled-out recess 9 is rotatably mounted, the said recess 9 being in the position of the cock plug shown located in line with a discharge channel 10 in a branch 11 on the side wall 1 of the cock casing located substantially opposite the inlet tube 4 and being inclined downwardly.

When the milking machine milking claw shown in Fig. 1 is used, teat cups are placed on the branches 3 and 4 and on the two remaining branches lying behind the branches 3 and 4, while to the branch 11 one end of a milk hose is secured, the other end of which is connected to a milk container which is in turn in communication with a vacuum plant. When the teat cups are placed on the teats of a cow, the milking claw will hang substantially in the position shown, which thus forms the vertical position of the milking claw, whereby the axis of the cock plug normally extends at an angle oblique to the vertical. The branch 11, the axis of which is substantially located in the vertical plane containing the axis of rotation of the cock plug, likewise extends obliquely, substantially at right angles to the axis of the cock plug, so that the discharge conditions for the milk are good. When the cock plug 7 is turned by means of the handle 8, the discharge channel 10 is blocked. The cock plug is kept in its place in the cock casing by means, not shown, of a type known per se.

In the embodiment shown in Fig. 2, the conical side wall and end wall of the cock casing are designated by 12 and 13, respectively. Of the four supply branches, only two are, as was the case above, shown here designated by 14 and 15. In the branches, supply channels 16 and 17 are provided, of which the channels 16 terminate inside the end wall 13, while the channels 17 pass through the side wall 12 and terminate in the sealing face of the cock casing for the cock plug, which is designated by 18 and is provided with a handle 19 and a milled-out recess 20. In the position shown, one end of the latter lies in line with the channel 17 shown and the associated channel lying behind the channel 17, while the other end of the milled-out recess lies in line with a channel 21 in a branch 22 on the side wall 12 of the cock casing.

As was the case with the milking claw shown in Fig. 2, the axis of the discharge channel 21 lies in the vertical plane containing the axis of rotation of the cock plug and substantially at right angles to the said axis, and the inner mouth 21a of the discharge channel thus lies at or in the vicinity of the said vertical plane and below the axis of rotation of the cock plug, while the mouth 17a of the supply channels 17 lie above the said axis.

The recess 20 establishes a communication between the said mouths in the open position of the cock shown.

In this embodiment, which is otherwise used and functions in a similar way as that shown in Fig. 1, the branch 22 may be designed with a considerably greater declination than the branch 11 in Fig. 1, and this is a result of the fact that the cock plug 18 gets a greater declination than the cock plug 7 in Fig. 1, the supply branches 14 and 15 being turned a greater angle clockwise with regard to the cock casing in relation to the supply branches 3 and 4 in Fig. 1.

I claim:

1. A milking machine milking claw comprising a cup-shaped casing having an end wall and a flaring side wall, whereby it is open opposite said end wall, a plurality of inlet tubes communicating with the interior of the casing, at least one of said tubes extending from the end wall and at least one extending from a portion of the side wall, said tubes being in diverging relation relative to each other, a milk outlet tube extending from the side wall substantially opposite said second-named inlet tube, and a cock plug rotatably mounted in the open portion of the casing in sealing relation therewith, said plug having a recess registrable with the inlet tubes and said outlet tube, said casing being normally positioned with the outlet tube inclined downwardly, the axis of the plug normally extending at an angle oblique to the vertical.

2. A milking machine milking claw as claimed in claim 1, wherein the outlet tube is disposed substantially at right angles to the axis of the cock plug.

3. A milking machine milking claw as claimed in claim 1, in which the mouth of the outlet tube lies in the sealing surface of the casing and wherein the center of said mouth lies substantially in the same vertical plane as the axis of the cock plug.

4. A milking machine milking claw as claimed in claim 3, in which the axis of the outlet tube is located substantially in the same vertical plane as the axis of the cock plug.

5. A milking machine milking claw as claimed in claim 1, in which the mouths of two of the inlet tubes are located in the surface of the casing relatively close together above the cock plug, while the mouth of the outlet tube lies in the sealing surface of the casing substantially in the same vertical plane as the axis of the cock plug, the recess in the cock plug extending substantially transversely of the plug and being located to establish communication between said two inlet tube mouths and the mouth of the outlet tube.

6. A milking machine milking claw as claimed in claim 5, wherein said recess comprises a substantially straight oblique passage communicatively connecting the two inlet tube mouths to the mouth of the outlet tube.

7. A milking machine milking claw as claimed in claim 1, in which said recess is in the upper side of the cock plug and is located and formed so that it may be aligned with the outlet tube so that said outlet tube may substantially constitute a continuation of said recess.

8. A milking machine milking claw as claimed in claim 7, in which two inlet tubes are so located that their inner mouths open substantially into the upper end of said recess and so that the latter substantially constitutes a continuation of said two inlet tubes.

References Cited in the file of this patent

UNITED STATES PATENTS

| 2,507,969 | Gascoigne | May 16, 1950 |

FOREIGN PATENTS

| 563,390 | Great Britain | Aug. 11, 1944 |
| 74,156 | Denmark | Apr. 28, 1952 |
| 74,390 | Denmark | June 16, 1952 |